Dec. 24, 1963  I. E. SEPULVEDA  3,115,055

PORTABLE MACHINING TOOL

Filed Jan. 31, 1961  2 Sheets-Sheet 1

INVENTOR.
ISMAEL E. SEPULVEDA
BY
Mason & Graham
ATTORNEYS

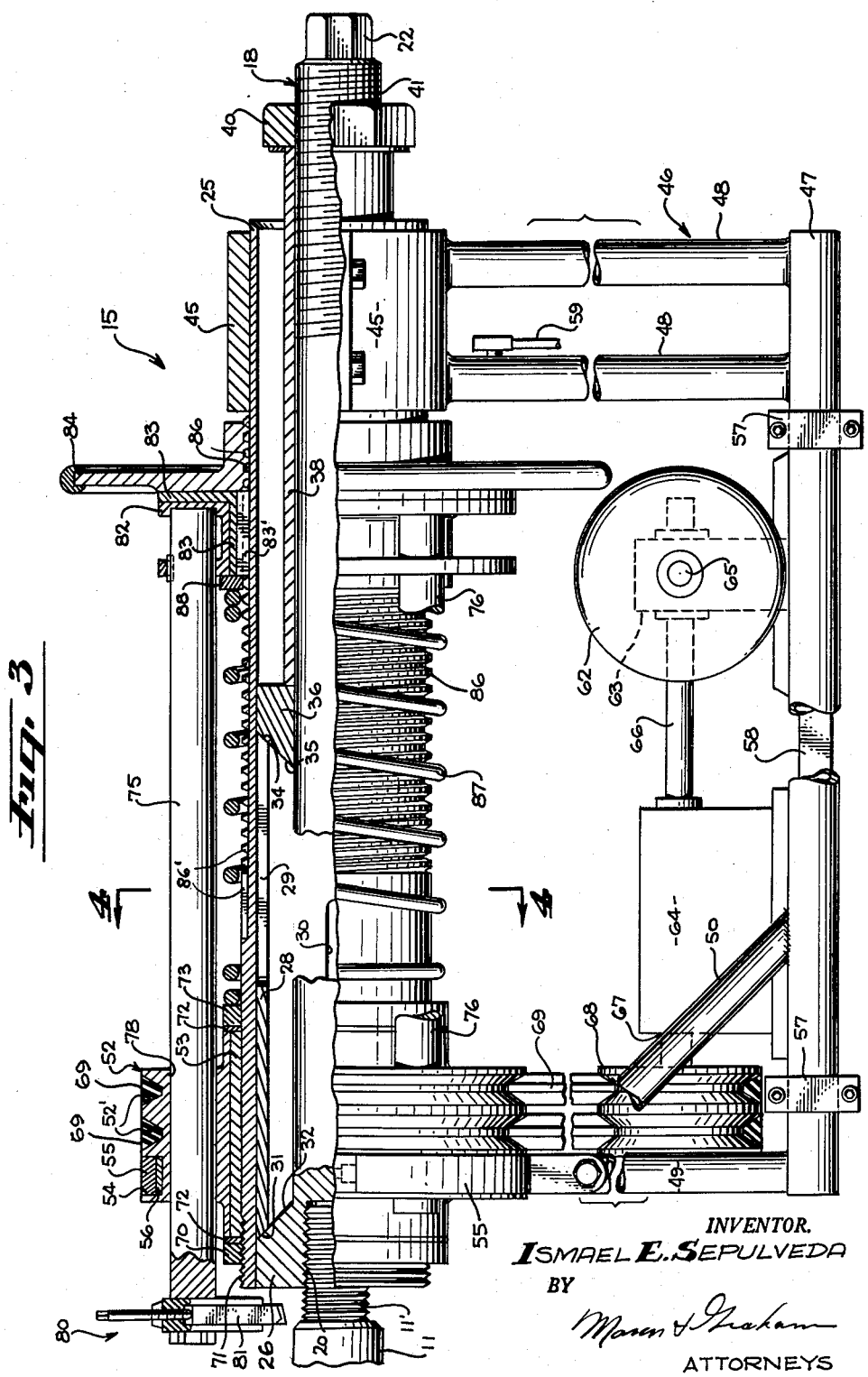

United States Patent Office 3,115,055
Patented Dec. 24, 1963

3,115,055
PORTABLE MACHINING TOOL
Ismael E. Sepulveda, 1445 E. 74th St., Los Angeles, Calif.
(900 Wilshire Blvd., Suite 930, Statler Center, Los Angeles, Calif.)
Filed Jan. 31, 1961, Ser. No. 86,073
6 Claims. (Cl. 82—4)

This invention has to do generally with portable machine tools.

A major problem in maintaining trucks, truck trailers and semitrailers is that of rebuilding the worn journal or bearing portions of the axles periodically. Conventionally this is done by removing the axles from the vehicle, building up the worn journal portions with weld metal, and then machining them to size in a lathe. This is an expensive operation both from the standpoint of cost of labor involved and from the standpoint of loss of use of the vehicle while the work is being performed. In this connection the removal, renewal and replacement of two axles requires about three-days' time.

An object of the invention is to provide a novel and improved machine which enables the machining of the axles without removing them from the trailer or other vehicle thereby saving time formerly required to remove and replace the axles and reducing the over all time of a three-day job to one day.

Another object is to provide a portable machine which mounts directly on the vehicle axle for machining previously built-up journal portions of the axle. In this connection it is an object to provide such a machine which is adjustable axially of the axle once it has been mounted thereon in order to enable the machining of both journal portions at one end of the axle.

It is a further object to provide such a machine which is readily adaptable to different sized axles.

These and other objects will be apparent from the drawings and the following description. Referring to the drawings:

FIG. 3 is a longitudinal sectional elevational view of the machine of FIGS. 1 and 2, but on a larger scale.

Figure 1:
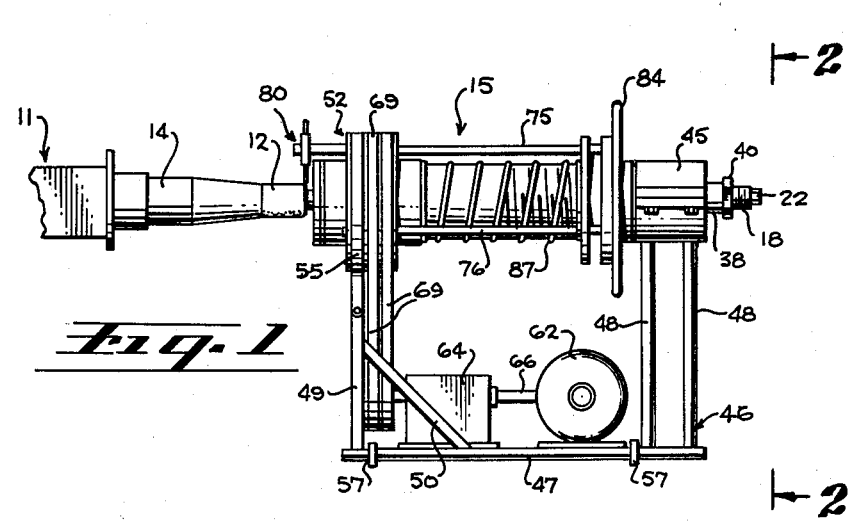
FIG. 1 is a side elevational view of a machine embodying the invention and shown in conjunction with the end portion of an axle to be machined and upon which the machine is mounted.
Figure 2:
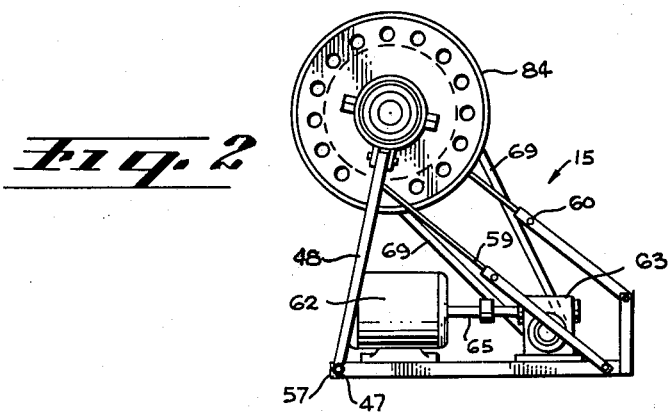
FIG. 2 is an end elevational view on line 2—2 of FIG. 1.
Figure 4:
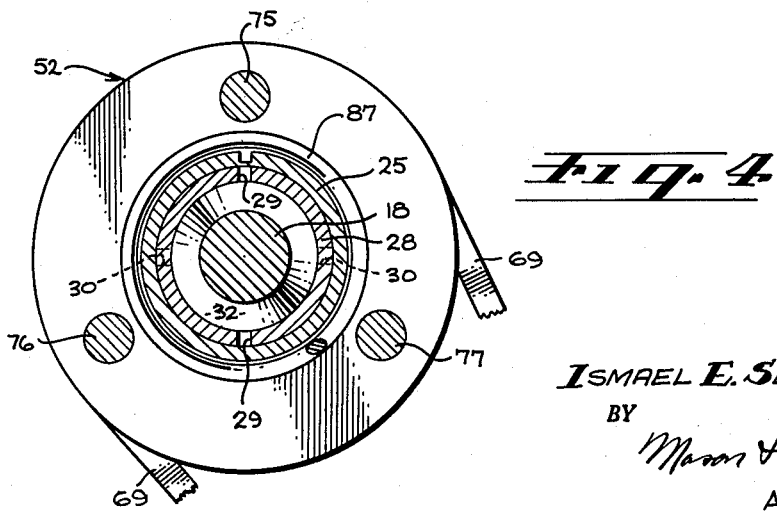
FIG. 4 is a cross sectional view on line 4—4 of FIG. 3.

More particularly describing the invention, in FIGS. 1 and 3 I show the vehicle axle fragmentarily, this being designated generally by numeral 11. The axle is shown as having two journal or wheel bearing portions, designated 12 and 14, which may be assumed to have been built up to over-size condition by application of weld metal. The machine 15 of the invention is adapted to mount directly on the end of the axle for the purpose of machining the portions 12 and 14 to size.

The machine is built around a central support bar 18 which is detachably secured to the threaded end portion 11' of the vehicle axle 11, the bar being provided with a threaded recess or socket 20 for the purpose of receiving the end portion of axle 11. A hexagonal section 22 is provided at the outer end of bar 18 for attaching a wrench or other tool.

The machine has a cylindrical body, numbered 25, which closely fits over the enlarged forward end portion 26 of bar 18. The body is detachably secured in place by means of an expansible tube 28 which is provided with longitudinal slots 29 extending inwardly from one end and circumferentially offset longitudinal slots 30 extending inwardly from the other end. The inner or forward end of member 28 is beveled at 31 to fit against a beveled surface 32 of the enlarged portion 26 at the inner end of the rod. The other end 34 of the member 28 is also beveled to fit against a correspondingly inclined end surface 35 formed on a spacer ring 36. The latter fits over rod 18 and is adapted to be forced axially against the tube 28 by a sleeve 38 and nut 40 to expand the tube radially and thereby secure body 25. The nut 40 is mounted on a threaded section 41 of the rod and bears against the outer end of sleeve 38.

The outer end of body 25 is mounted in a split collar 45 which is carried by a frame 46 comprising a tubular cross member 47, two standards 48 connecting the collar 45 and member 46, and a third standard 49 with a brace 50. A rotary head 52 at the forward end of the body 25 is journaled for rotation thereon by means of a bearing member 53. The head is provided with a peripheral groove 54 to receive a strap 55 which is carried by standard 49. A bearing 56 inside the strap allows for rotation of the head.

The frame 46 is journaled at 57 at one edge of a platform 58 which carries two pivoted, longitudinally adjustable braces, designated 59 and 60, pivotally secured to one of standards 48 and to standard 49, respectively.

The platform carries a motor 62, gear reduction means 63 and 64, and drive shafts 65, 66, and 67. The latter carries sheaves 68. Belts 69 are trained around the sheaves and the rotary head 52, being received in grooves 52' in the head. Inasmuch as the platform is pivotally mounted with respect to frame 46, longitudinal adjustment of the brace members 59 and 60 serves to adjust the belts. The head 52 is retained on the body at the inner end thereof by an internally threaded ring 70 which is mounted on a threaded area 71 of body 25. Washers 72 are at each end of the head and a ring 73 is provided at the end opposite the threaded ring.

A plurality of feed bars, shown as three in number, designated 75, 76 and 77, are mounted in bores 78 in the head 52 for axial movement therethrough. Bar 75 is longer than the other two bars and carries a tool holding means 80 at its forward end, the latter means being shown as holding a cutting tool 81. The other ends of the feed bars are fixed in a ring 82 which is channel-shaped in cross section. The ring 82 is supported for rotation by means of bearing 83. This has a key 83'. A feed or handwheel 84, which is internally threaded, is mounted on a threaded portion 86 provided on the outer surface of body 25. A slot 86' receives key 83'. A spring 87 extends between the ring 73 and a ring 88 serving to releasably urge the mounting ring 82 against the handwheel 84 and maintain the rotary head 52 in place. It will be apparent that by rotating the handwheel 84 in the appropriate direction, the bars 75, 76, and 77 are advanced axially and thus the cutting tool 81 is advanced with respect to the axle. It will also be apparent that when the motor is running the entire rotary head assembly including the feed bars rotates so that the cutting tool will rotate around the journal portion of the axle to be machined.

In the use of the device, the support bar 18 is first secured to the outer end of the axle. An adapter (not shown) can be used between the bar and axle for a different size of axle. Then the other portions of the device are slipped over the support bar and nut 40 tightened to secure body 25 to the rod 18. The machine is then ready for operation to machine the journal portion 12 of the axle. As previously indicated, the head 52 and feed bars 75, 76 and 77 are rotated by the motor, causing the tool to rotate around the part to be machined. The tool is advanced by turning the hand wheel 84. After the first journal portion 12 of the axle has been machined the nut 40 is loosened and the body 25 and parts connected thereto are then slid forward to a position such that the second journal portion 14 of the axle can be machined, after which nut 40 is tightened to again secure the parts.

Although I have illustrated and described preferred forms of my invention, I contemplate that various changes and modifications can be made therein without departing from the invention, the scope of which is indicated by the following claims.

I claim:

1. In a portable machining tool adapted to be attached to a vehicle axle for machining a journal portion thereof, a support bar adapted to be attached to the end of the axle and extend in axial alignment therewith, a cylindrical body slidably receiving said bar, means between the bar and body detachably securing the body to the bar and against relative movement, a rotary head rotatably mounted on said body, means on the head for carrying a cutting tool in a position beyond the inner end of the body means carried by said body for advancing said last-named means axially of the body, and motorized means for rotating said rotary head.

2. A machining tool as set forth in claim 1 in which the means for detachably securing the body to the bar comprises a split sleeve inside said body, and means carried by said support bar engageable with said sleeve for expanding the same.

3. In a portable machining tool of the type desired, a support bar adapted to be attached directly to an axle to be machined in longitudinal alignment therewith, a cylindrical body around and detachably secured to said bar, a rotary head carried by said body and carrying means for supporting a cutting tool in advance of said body, said last mentioned means including feed bars extending axially of the body and movable through said head and a rotary ring rotatably supported on said body and supporting said feed bars, feed thread means on said body, a feed nut carried on said feed thread means and movable for advancing said ring and said bars as a unit, and motorized means carried by said body for rotating said head relative to said body.

4. In a portable machining tool adapted to machine portions of an axle or the like, a support bar adapted to be threadedly attached to the end of the axle and extend in alignment therewith, a cylindrical body adapted to fit around said bar, means for detachably securing said cylindrical body to said bar, a rotary head carried by said body, a plurality of feed bars extending axially of said body and mounted in said head for axial movement therethrough, one of said bars carrying means for supporting a cutting tool and projecting ahead of said body, a rotary support for said bars rearwardly of said head on said body, a feed thread on said body, a feed nut carried by said body on said thread and movable against said rotary support for advancing said bars through said head, and motor means carried by said body and operably connected to drive said head.

5. A portable machining tool adapted to be attached to a vehicle axle for machining a portion thereof, comprising a support bar adapted to be threadedly secured to the end of the axle and extend in alignment therewith, a cylindrical body slidably receiving said bar, expansible means between said body and said bar for detachably securing the body to the bar and against relative movement, a rotary head member rotatably mounted on said body, a plurality of bars carried by said head for axial movement therethrough, said bars extending axially of the body, one of said bars carrying means for supporting a cutting tool, a supporting ring mounted rotatably on said body and supporting the ends of said bars, a feed thread on said body, an internally threaded feed wheel on said body engaging said thread, said wheel being positioned outwardly of said supporting ring, spring means urging said supporting ring against said wheel, a motor support platform carried by said body, a motor on said platform, and belt means connecting said motor and said rotary head, said head being grooved for the reception of the belt means.

6. A portable machining tool adapted to be attached to a vehicle axle having a threaded end for machining a portion of the axle, comprising a support bar having a threaded socket at its inner end adapted to receive the end of the axle, a cylindrical body about said bar and positionable axially thereof, expansible means between said body and said bar for detachably securing the body to the bar, a rotary head member rotatably mounted on said bar, a plurality of bars carried by said head for axial movement therethrough, said bars extending axially of the body, one of said bars extending beyond the inner end of the body and beyond the other bars and carrying means for supporting a cutting tool, a supporting ring mounted rotatably on said body and supporting the ends of said bars, a feed thread on said body, an internally threaded feed wheel on said body and engaging said thread, said wheel being positioned outwardly of said supporting ring, a coil compression spring around said body between said head and said supporting ring urging the latter against said wheel, a motor support platform carried by said body, a motor on said platform, and belt drive means connecting said motor and said rotary head.

References Cited in the file of this patent

UNITED STATES PATENTS

| | | |
|---|---|---|
| 647,696 | Clover | Apr. 17, 1900 |
| 884,966 | Westbrook | Apr. 14, 1908 |
| 2,695,529 | Evans | Nov. 30, 1954 |
| 2,706,425 | Sherrill | Apr. 19, 1955 |